United States Patent
Olson

(10) Patent No.: US 7,000,576 B2
(45) Date of Patent: Feb. 21, 2006

(54) CONTAINER FOR LIQUIDS

(75) Inventor: Brad Olson, Painwell, MI (US)

(73) Assignee: Mann & Hummel GmbH, Ludwigsburg (DE)

( * ) Notice: Subject to any disclaimer, the term of this patent is extended or adjusted under 35 U.S.C. 154(b) by 96 days.

(21) Appl. No.: 10/432,959

(22) PCT Filed: Nov. 29, 2001

(86) PCT No.: PCT/US01/44488

§ 371 (c)(1),
(2), (4) Date: Nov. 24, 2003

(87) PCT Pub. No.: WO02/44074

PCT Pub. Date: Jun. 6, 2002

(65) Prior Publication Data

US 2004/0069252 A1 Apr. 15, 2004

Related U.S. Application Data

(60) Provisional application No. 60/253,747, filed on Nov. 29, 2000.

(51) Int. Cl.
F01P 3/20 (2006.01)

(52) U.S. Cl. .............................. 123/41.51; 123/41.54; 220/555

(58) Field of Classification Search .............. 123/41.51, 123/41.54; 220/4.13, 555
See application file for complete search history.

(56) References Cited

U.S. PATENT DOCUMENTS 4,441,463 A * 4/1984 Rest et al. ................... 220/555
5,313,809 A * 5/1994 Isaacson et al. .............. 62/530
6,189,492 B1 * 2/2001 Brown ..................... 123/41.49

FOREIGN PATENT DOCUMENTS

DE 4103523 8/1992

* cited by examiner

Primary Examiner—Noah P. Kamen
(74) Attorney, Agent, or Firm—Crowell & Moring LLP

(57) ABSTRACT

A container for liquids is proposed, with a first chamber for a first liquid and an additional chamber for a second liquid. Between these two chambers at least one additional chamber is provided for the mechanically joining together the liquid-filled chambers. This additional chamber is sealed from the liquid-filled chambers.

6 Claims, 2 Drawing Sheets

CONTAINER FOR LIQUIDS

BACKGROUND OF THE INVENTION

The invention relates to a container for liquids having a first chamber for a first liquid and a second chamber for a second liquid. Such containers are used in many areas of technology and serve to transport or store two liquids in a compact manner. Usually these containers are provided with a dividing wall so that exchange between the liquids cannot take place. If liquids are to be transported or stored at different temperatures, temperature equalization takes place. This can be advantageous. However, if each liquid is to have a specific temperature this may have a disadvantageous effect on the use of the liquid. It is also known to provided two containers in order to avoid temperature equalization and connect them together just with a bridge. This, however, results in greater cost of manufacture. Also the advantage of the one-piece container is lost.

SUMMARY OF THE INVENTION

The invention therefore is addressed to the problem of creating a container for liquids which will have at least two chambers for liquids, and which is simple to manufacture, and will avoid the above-described disadvantages. This problem is solved in that a chamber sealed from the liquid-filled chambers is provided for the mechanical joining together of the liquid-filled chambers.

ADVANTAGES OF THE INVENTION

The advantage of the invention is that the container is a single structure, but is one in which the liquids are thermally insulated by the interposition of an additional chamber. Thus no temperature equalization can take place between the two liquids. In an embodiment of the invention the additional chamber for the mechanical connection is open on at least one side. This additional chamber can therefore be made in an especially simple manner. In another embodiment of the invention the liquid-filled chambers are provided with openings suitable for filling them with the liquids. Screw covers or snap-on caps can be used, permitting easy filling with liquid.

In a further embodiment, the additional chamber which produces the mechanical junction is filled with a thermal insulating material, as for example foam polystyrene or a thermal insulating gas. Of course, it is also possible to evacuate this chamber in order thus to achieve a great insulating effect.

In another embodiment of the invention the chambers for the liquids are divided by walls between them. Especially in the case of a container that is subjected to great motion it is desirable to provide dividing walls so as to avoid excessive movements of liquid, the dividing walls having openings to allow passage. Advantageously the container consists of a thermoplastic synthetic resin material, such as polyethylene or polystyrene, and is composed of a bottom part and an upper part. The two parts are sealed together by welding them liquid-tight. Friction welding can be used to join them. Such a container can be used for the washing fluid for the windshield of a vehicle and also for coolant for the internal combustion engine of the vehicle. The coolant of the internal combustion engine can reach a temperature up to about 90° C. The windshield washer fluid is not to exceed a temperature of 40° C. since otherwise certain components may evaporate away. It is therefore especially advantageous to provide the additional chamber for mechanical connection as an insulating chamber between the two liquids. If the container is installed in the engine compartment of a motor vehicle it is desirable to fasten it on the radiator of the internal combustion engine so that no long connecting lines from the radiator to the cooling liquid reservoir are necessary. Also, ease in filling the containers with liquids is assured since the top of the radiator is easily accessible.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

Additional details of the invention are described in the drawing with reference to illustrative preferred embodiments.

DETAILED DESCRIPTION OF PREFERRED EMBODIMENTS

Figure 1:
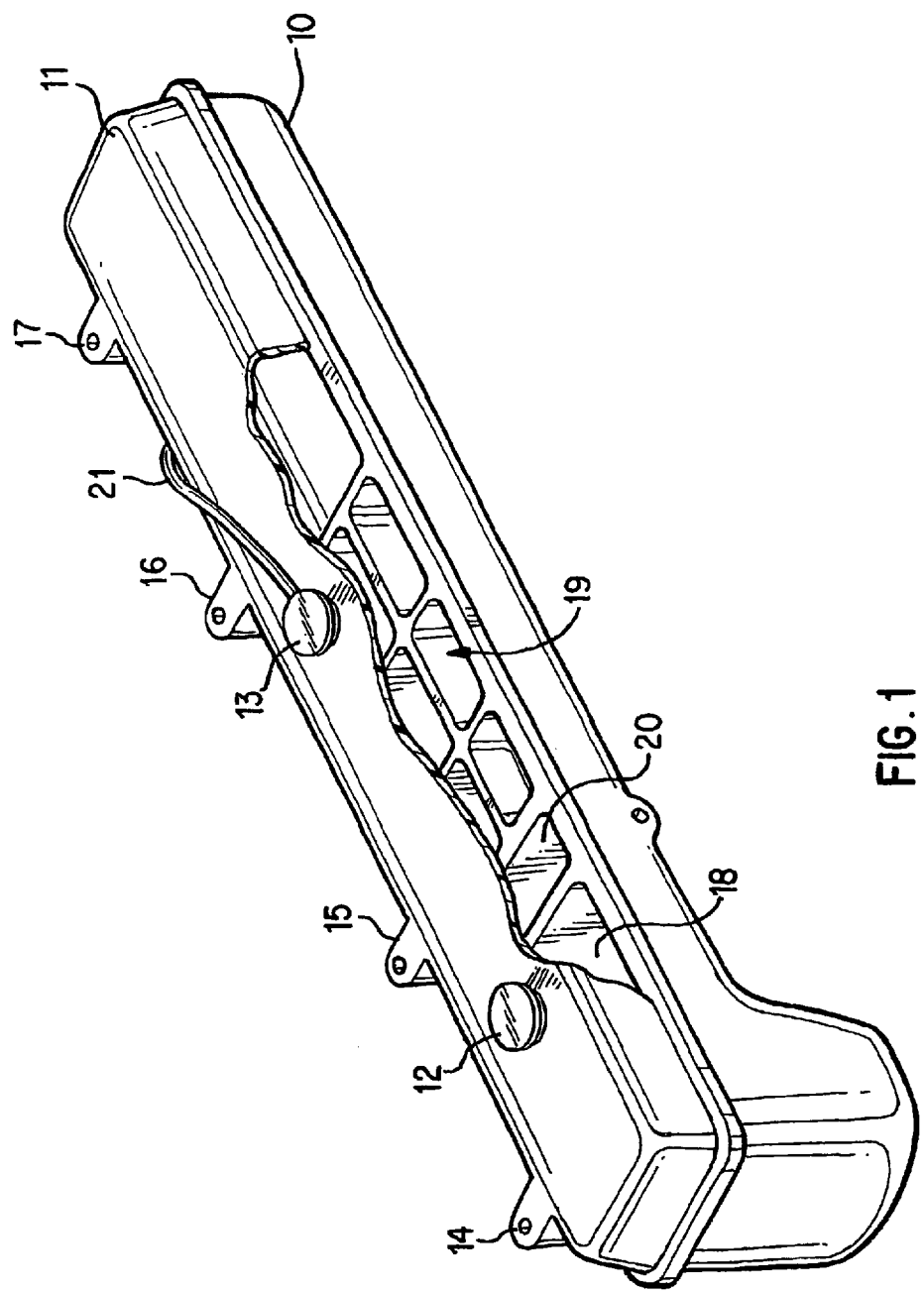
FIG. 1 is a schematic representation of a container for fluids.

The container for liquids, shown in FIG. 1, consists of a bottom part 10, an upper part 11, and filler openings 12 and 13, and various connections not shown here for carrying the liquids away. The container can be fastened by appropriate fastening means 14, 15, 16, 17, to a support not shown here. In the container is a first chamber 18 for the windshield washer fluid of a vehicle. Also, there are several chambers 19 connected to one another for the coolant of an internal combustion engine. Between the first chamber 18 and the chambers 19 a chamber 20 is provided for the mechanical connection between the first chamber 18 and the other chambers 19. This chamber 20 is sealed off from the liquid-filled chambers, i.e., there is air in this chamber. There is also the possibility of designing this chamber as a vacuum chamber. The filler opening 13 for the coolant of an internal combustion engine is provided with a hose 21. Excess coolant can be carried away through this hose.

Figure 2:
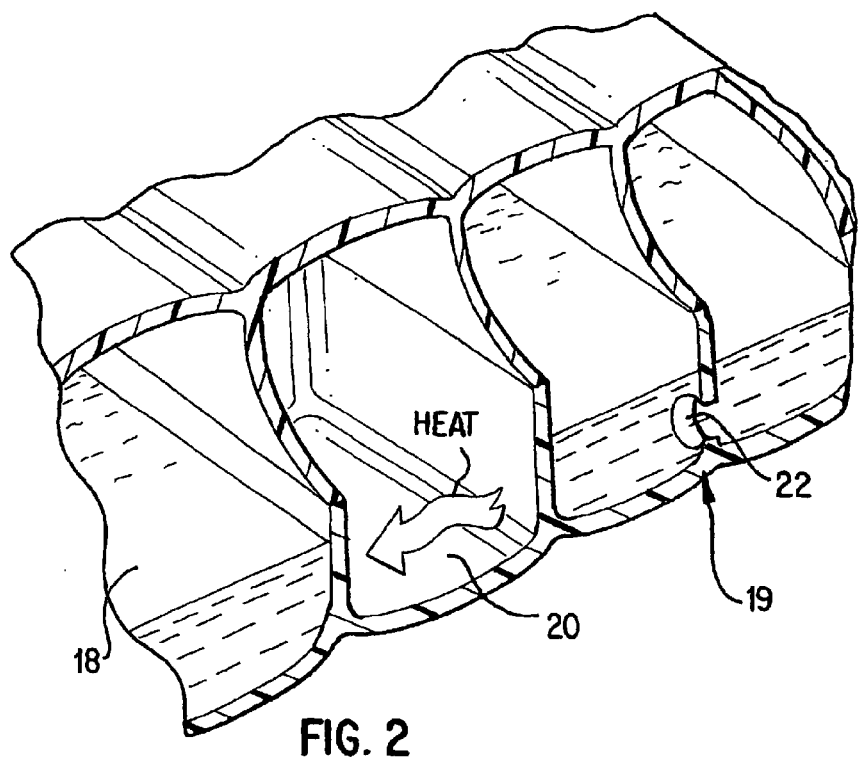
FIG. 2 is a detail view thereof.

FIG. 2 shows a detail of chamber 20. In this figure it can be seen that the chambers 19 are connected to one another through an opening 22. Through this opening 22 the equalization of the liquid in the individual chambers takes place. Separation into several chambers has the advantage that, at a liquid temperature of up to 90° C., the stability of the container, which is made of thermoplastic, is assured. The chamber 18 is filled with washer fluid. The figure shows clearly that temperature equalization between the hot radiator coolant and the windshield washer fluid is effectively prevented by the interposition of an insulating chamber. Chamber 20 can be open on one side. This has the advantage of reducing the difficulty of manufacture. Of course, this chamber can also be filled with insulating material.

Figure 3:
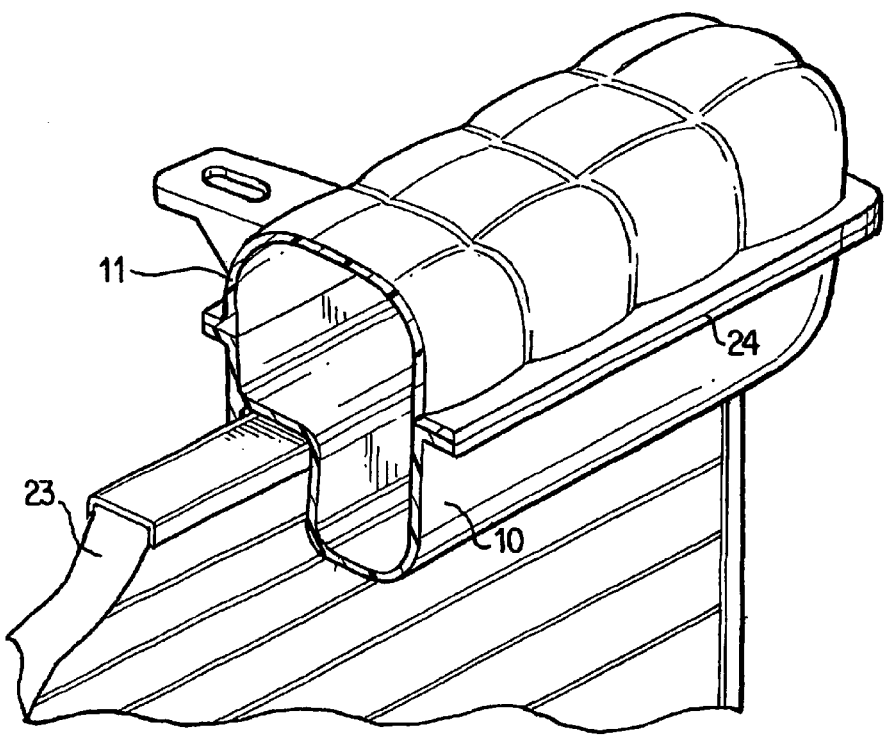
FIG. 3 shows the arrangement of the container on the radiator of an internal combustion engine.

FIG. 3 shows the arrangement of the container on the radiator 23 of an internal combustion engine. In this drawing the top side of the radiator 23 is shown. The container surrounds this upper side at least where the coolant of the internal combustion engine is situated. The container area for the washing fluid can be arranged outside of the radiator top. FIG. 3 furthermore shows the connection between bottom part 10 and upper part 11. The connecting flange 24 serves for the reliable welding of the two parts. Here the friction welding method has proven especially effective.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. Container for liquids with at least a first chamber for a first liquid, a second chamber for a second liquid, and at least one thermally insulating additional chamber interposed between the first and second chambers for mechanically joining together the first and second chambers; said at least one thermally insulating additional chamber separating the first chamber from the second chamber so the first and second chambers share no common walls through which heat could pass, wherein said container is comprised of a thermoplastic synthetic resin material and has a bottom part and an upper part, and said bottom part and upper part are joined together liquid-tight by welding, and wherein the first chamber for the first liquid and the second chamber for the second liquid each have an opening for filling them with the liquid.

2. Container according to claim 1, characterized in that the first and second chambers for the liquid are divided by partition walls having openings therethrough.

3. Container according to claim 1, characterized in that the first liquid is wash fluid for the windshield of a motor vehicle and the second liquid is coolant for the internal combustion engine of a motor vehicle.

4. Container according to claim 3, characterized in that it is fastened on a radiator of the internal combustion engine.

5. Container for liquids with at least a first chamber for a first liquid, a second chamber for a second liquid, and at least one thermally insulating additional chamber interposed between the first and second chambers for mechanically joining together the first and second chambers; said at least one thermally insulating additional chamber separating the first chamber from the second chamber so the first and second chambers share no common walls through which heat could pass, wherein said container is comprised of a thermoplastic synthetic resin material and has a bottom part and an upper part, and said bottom part and upper part are joined together liquid-tight by welding, and wherein the additional chamber for the mechanical connection is open on at least one side.

6. Container for liquids with at least a first chamber for a first liquid, a second chamber for a second liquid, and at least one thermally insulating additional chamber interposed between the first and second chambers for mechanically joining together the first and second chambers; said at least one thermally insulating additional chamber separating the first chamber from the second chamber so the first and second chambers share no common walls through which heat could pass, wherein said container is comprised of a thermoplastic synthetic resin material and has a bottom part and an upper part, and said bottom part and upper part are joined together liquid-tight by welding, and wherein the additional chamber for the mechanical connection is filled with a thermal insulating material or gas.

* * * * *